No. 694,643. Patented Mar. 4, 1902.
J. P. HOLLAND.
SUBMARINE BOAT.
(Application filed Aug. 21, 1901.)
(No Model.)
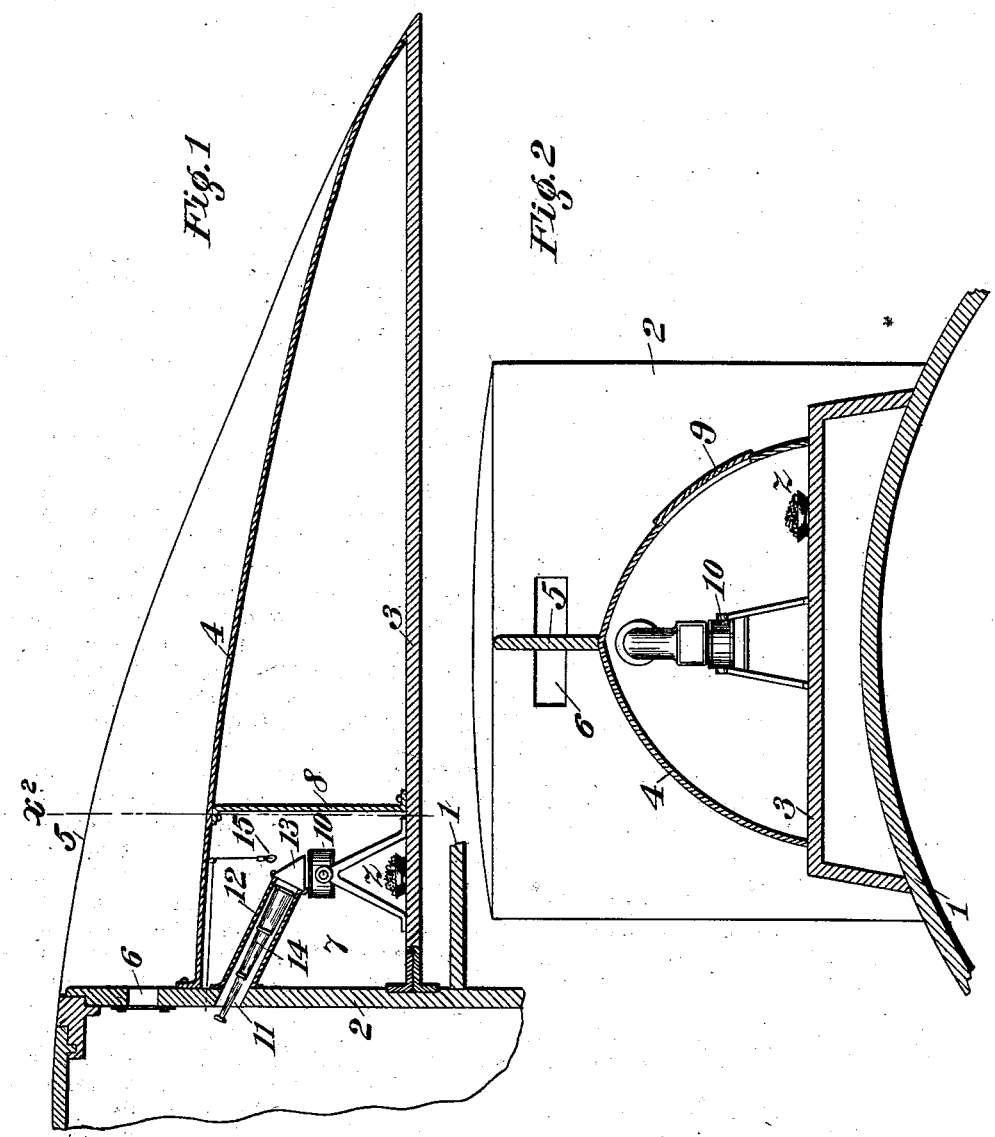
Witnesses
Bert C. Jones.
Charles W. Hildreth.
John P. Holland
Inventor
By their Attorney
Henry Connett

UNITED STATES PATENT OFFICE.

JOHN P. HOLLAND, OF NEWARK, NEW JERSEY.

SUBMARINE BOAT.

SPECIFICATION forming part of Letters Patent No. 694,643, dated March 4, 1902.

Application filed August 21, 1901. Serial No. 72,744. (No model.)

*To all whom it may concern:*

Be it known that I, JOHN P. HOLLAND, a citizen of the United States, residing at Newark, Essex county, New Jersey, have invented certain Improvements in Submarine Boats, of which the following is a specification.

This invention relates to the mounting of the compass on a submarine boat or vessel whereby it may be exterior to the conning-tower or turret and yet be open to constant inspection by the steersman in the tower.

For reasons which it will not be necessary to enter into here it is important that the compass of a submarine boat shall be located exterior to the turret or conning-tower, and the object of the present invention is to provide a construction and means which permits of this and yet enables the steersman to inspect the compass and ascertain its readings at any time and also means for preventing the collection of moisture in the binnacle-chamber.

In the accompanying drawings, which serve to illustrate the invention, Figure 1 is a vertical axial section of a part of a submarine boat, showing the arrangement of the compass and binnacle with reference to the conning-tower. Fig. 2 is a cross-section in the plane indicated by line $x'$ in Fig. 2.

1 represents a part of the hull of a submarine boat; 2, a part of the conning-tower or turret which is elevated above the back of the hull.

3 is a part of the hollow superstructure on the hull in front of the tower.

4 is a hollow structure on the deck of the superstructure, this structure 4 having, by preference, in longitudinal and transverse section substantially the contour seen in the drawings.

5 is a fin which abuts against the tower and slopes down to the deck in front. This device serves as a fender to prevent the fouling of lines or cables with the tower. In the front of the tower is the glazed sight-aperture 6 for the use of the steersman.

The above features form no novel part of the present invention, but are shown herein to illustrate more clearly the novel features.

In the structure or housing 4 is formed a binnacle-chamber 7 by a cross-partition 8, as here shown, and in this chamber, to which access may be had by a hermetic door 9, is the compass 10. This may be the ordinary mariner's compass, supported on any suitable stand. The chamber 7 is of course made water-tight, and some hygroscopic substance avid of moisture may be placed in the chamber to take up any moisture and prevent it from condensing on the glass and other surfaces therein. In Fig. 1 this substance, which may be magnesium chlorid, is seen at $z$.

In order that the steersman may inspect the compass at any time, there is an aperture 11 in the wall of the tower, and a tube 12 is fixed to the tower and extends into the chamber 7 to a point over the compass, said tube having mounted in or at its inner end a prism 13 to deflect the image of the compass-card and enable it to be seen through said tube. A terrestrial telescope 14 or other glass suitable for the purpose of magnifying the image rests in the tube and is employed to magnify and define the image of the card. Light may be provided by an electric incandescent bulb 15, of which one or more may be employed, placed in suitable positions to illuminate the compass.

Obviously the details of the construction shown may be varied without departing from the invention. For example, the binnacle-chamber 7 is shown as formed by partitioning off part of the structure 4 already existing on a submarine boat; but this chamber may as well be formed in other ways. The telescope might also be fixed in position and the tube 12 be modified to serve merely as its support. The prism 13 might be substituted by a mirror set at an angle so as to reflect the image; but a prism is preferred, for the reason that a mirror is not so durable. The prism might of course be attached to the telescope.

Any deliquescent salt or substance avid of moisture and not injurious to the metal parts may be employed to dry the air in the binnacle-chamber.

Having thus described my invention, I claim—

1. A submarine boat having a conning-tower, a water-tight binnacle-chamber exterior to the tower and to the shell or hull of the boat, a compass in said chamber, means for illuminating said chamber, and a way or passage connecting the interior of the conning-tower with a point in the binnacle-chamber over the compass, whereby the steersman is enabled to inspect the compass-card from the tower.

2. A submarine boat having a conning-tower, a water-tight structure forming a binnacle-chamber adjacent to the tower and exterior thereto and to the hull of the boat, a telescope-tube connecting the interior of the tower with the said chamber, a compass in said chamber and visible through said tube, and means for illuminating said compass.

3. A submarine boat having a conning-tower which projects above the hull of the boat, a water-tight binnacle-chamber exterior to the hull and conning-tower, a compass in said chamber, a tube extending from the interior of the tower to a point in said chamber over the compass, means at the end of said tube over the compass for deflecting the image of the compass-card so that it may be seen through the tube from the tower, and means for illuminating the compass-card.

4. A submarine boat having a conning-tower which projects above the hull of the boat, a structure forward of and adjacent to said projecting tower containing a water-tight binnacle-chamber for a compass, the compass in said chamber, means for illuminating the compass, a tube extending from an aperture in the wall of said tower to a point over said compass, and a prism at the end of said tube and over the compass for deflecting the image of the compass-card so that it may be seen through said tube.

In witness whereof I have hereunto signed my name, this 15th day of August, 1901, in the presence of two subscribing witnesses.

JOHN P. HOLLAND.

Witnesses:
 PETER A. ROSS,
 K. M. CAPLINGER.